(12) United States Patent
Freeman

(10) Patent No.: US 7,383,956 B2
(45) Date of Patent: Jun. 10, 2008

(54) WOODWASTE RECYCLING APPARATUS AND METHOD

(76) Inventor: Jimmy L. Freeman, 2260 Catherine Collins La., Jacksonville, FL (US) 32218

( * ) Notice: Subject to any disclaimer, the term of this patent is extended or adjusted under 35 U.S.C. 154(b) by 375 days.

(21) Appl. No.: 11/286,520

(22) Filed: Nov. 25, 2005

(65) Prior Publication Data

US 2007/0119755 A1    May 31, 2007

(51) Int. Cl.
*B07B 1/18* (2006.01)
*B03B 7/00* (2006.01)
*B03C 7/00* (2006.01)

(52) U.S. Cl. ............... 209/284; 209/12.1; 209/12.2; 209/129; 209/288; 241/26; 241/299

(58) Field of Classification Search ............... 209/284, 209/12.1, 12.2, 129; 241/26, 299
See application file for complete search history.

(56) References Cited

U.S. PATENT DOCUMENTS

| | | | |
|---|---|---|---|
| 1,244,952 A | 10/1917 | Bryan | |
| 3,489,279 A * | 1/1970 | St John | 209/130 |
| 3,888,351 A | 6/1975 | Wilson | |
| 3,945,575 A * | 3/1976 | Marsh | 241/20 |
| 3,970,546 A | 7/1976 | Webb et al. | |
| 4,284,234 A * | 8/1981 | Rekant | 494/24 |
| 4,685,569 A * | 8/1987 | Osaki et al. | 209/571 |
| 4,923,581 A * | 5/1990 | Day | 204/571 |
| 5,074,992 A * | 12/1991 | Clinton | 209/19 |
| 5,084,161 A | 1/1992 | Vikio | |
| 5,203,359 A | 4/1993 | Fesmire et al. | |
| 5,335,786 A | 8/1994 | Roberto | |
| 5,351,895 A * | 10/1994 | Brooks et al. | 241/41 |
| 5,431,347 A | 7/1995 | Hayashi et al. | |
| 5,611,493 A | 3/1997 | Hayashi et al. | |
| 5,740,918 A | 4/1998 | Hayashi et al. | |
| 5,865,317 A | 2/1999 | Clinton | |
| 5,915,565 A | 6/1999 | Clinton | |
| 6,452,126 B1 | 9/2002 | Xiao et al. | |
| 6,467,628 B1 | 10/2002 | Maehata et al. | |
| 7,119,298 B2 * | 10/2006 | Yoshiyama et al. | 209/127.1 |
| 2005/0051646 A1* | 3/2005 | Horne | 241/23 |
| 2007/0054106 A1* | 3/2007 | Armstrong et al. | 428/304.4 |
| 2007/0119755 A1* | 5/2007 | Freeman | 209/284 |

* cited by examiner

*Primary Examiner*—Patrick Mackey
*Assistant Examiner*—Terrell Matthews
(74) *Attorney, Agent, or Firm*—William M. Hobby, III

(57) ABSTRACT

A woodwaste processing trommel apparatus has a rotating trommel for receiving and separating woodwaste by size. An elongated electrode is mounted within the trommel and has a polarized electric charge thereon for attracting plastic pieces having a static electric charge thereon. An elongated vacuum pipe is mounted in the trommel adjacent the electrode for removing plastic pieces clinging to the elongated electrode. An electrode and vacuum nozzle is also placed adjacent the end of the discharge conveyor to further remove plastic particles. A method of removing plastic intermixed with woodwaste in the trommel in accordance with the apparatus is also provided.

14 Claims, 3 Drawing Sheets

WOODWASTE RECYCLING APPARATUS AND METHOD

BACKGROUND OF THE INVENTION

The present invention relates generally to systems for recycling woodwaste and more particularly to an apparatus and method for separating contaminates from woodwaste to produce mulch, and material for potting mix, and the like.

Yard waste is usually contained in plastic bags where it is picked up by garbage trucks and taken to land fills. With increased tipping fees at waste disposal sites (landfills) and a shortage of such sites in urban areas, there is an ever-increasing incentive to separate woodwaste from the urban waste stream and to recycle it into other usable products.

The vast majority of this material is transported to landfills for burial, adding to the nation's solid waste disposal crisis.

Burying woodwaste in landfills is not only a waste but is becoming an unmanageable problem in terms of finding adequate space for such landfills. It is difficult to document the amount of woodwaste being land-filled nationwide. In addition to finding suitable landfill areas, landfilling is expensive. The environmental impact of landfilling is also just now being confronted through federal cleanup and monitoring programs like the EPA Superfund. The simplest way to lessen the environmental impact is to decrease the amount of woodwaste going to landfills.

Various equipment is currently on the market for processing wood and yard waste debris. Private companies and municipal public work department currently utilize grinders to grind up the woodwaste for recycling and to use as boiler fuel, landscaping products, soil additives and the like.

Contaminated (marginal) woodwaste can be processed only if the contaminates, such as plastics and sand, can be efficiently and economically removed. If the contaminants are removed, the processed product may be marketable as landscaping products and the like.

An object of the present invention is to provide an economically-viable alternative to landfilling woodwaste.

Yet another object of the present invention is to provide high quality, marketable end products from urban woodwaste.

Prior U.S. patents which process woodwaste for the removal of contaminants, such as plastic, can be seen in the Clinton U.S. Pat. No. 5,865,317 and No. 5,915,565, both of which provide systems for processing woodwaste. The woodwaste is received at one end of the system and metal contaminants are removed from the woodwaste which is then separated according to size for further processing. Unwanted papers and plastic contaminants are removed from the woodwaste using a cyclone and a door and a vacuum system. The cyclone may be positioned in the system for removing plastics prior to feeding the woodwaste into a trommel. In the J. W. & D. R. Bryan U.S. Pat. No. 1,244,952, a method of separating and recovering domestic refuse is provided using a trommel having different sized screens for rotating the pulverized domestic refuse through. The screens are rotated while an electric fan provides a current of air over each of the screens to draw dust laden air from the trommel. The Maehata et al. U.S. Pat. No. 6,467,628 is a plastic chip separator which electrostatically separates different kinds of crushed plastic pieces and sorts them according to kind. The Webb et al. U.S. Pat. No. 3,970,546 is a method and apparatus for separating non-ferrous metal from waste material and utilizes a drum and a D.C. corona electrode and an A.C. corona electrode and a D.C. static electrode and a splitter. The material is successively subjected to the D.C. corona discharge, the A.C. corona discharge, and a D.C. electrostatic field to separate non-ferrous material from municipal waste. The Xiao et al. U.S. Pat. No. 6,452,126 is an electrostatic separation using separating waste plastics from beverage bottles, PVC from PET, and packaging plastics, PE from PP. The Roberto U.S. Pat. No. 5,335,786 is a method and apparatus for separating and recycling of plastic. The Vikio U.S. Pat. No. 5,084,161 is a method and apparatus for the removal of light material from fiber suspension and utilizes a separation device, such as a vibrating screen, vibrating drum, curved screen or inverted cyclone for removing plastic. The Wilson U.S. Pat. No. 3,888,351 is an automatic refuse reclamation system which initially separates light paper, light plastics, magnetic materials, large items and fines. The Hayashi et al. U.S. Pat. No. 5,740,918 is an apparatus and method for density separation of plastic.

The present invention is directed towards a woodwaste and plastic processing trommel which utilizes a rotating trommel having electrodes mounted therein and a vacuum removal tube for separating chopped up plastic waste from the woodwaste.

SUMMARY OF THE INVENTION

A woodwaste processing trommel apparatus includes a rotating trommel for receiving and separating woodwaste by size. The trommel has an input for receiving woodwaste thereinto and an output therefrom for discharging woodwaste therefrom. An elongated electrode is mounted within the trommel for placing a polarized electric charge thereon during operation of the trommel for attracting plastic pieces having a static electric charge thereon mixed in with the woodwaste. An elongated vacuum tube is mounted in the trommel adjacent the electrode or the vacuum tube can form the electrode. The vacuum tube has a plurality of openings positioned therein to remove plastic pieces clinging to the elongated electrode so that the plastic waste is removed during the operation of the trommel. An additional electrode is placed at the end of the output conveyor and has a suction nozzle adjacent thereto for collecting and removing plastic pieces. The method of removing plastic intermixed with woodwaste and a woodwaste processing trommel includes selecting a rotating trommel in accordance with the apparatus receiving woodwaste having plastic pieces therein in the input to the selected rotating trommel and placing a static electric charge on the electrode and capturing plastic pieces from the woodwaste collected on the electrode and vacuum removing of the captured plastic pieces through the vacuum pipe whereby intermixed plastic pieces are removed from woodwaste during the processing of woodwaste through a trommel.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
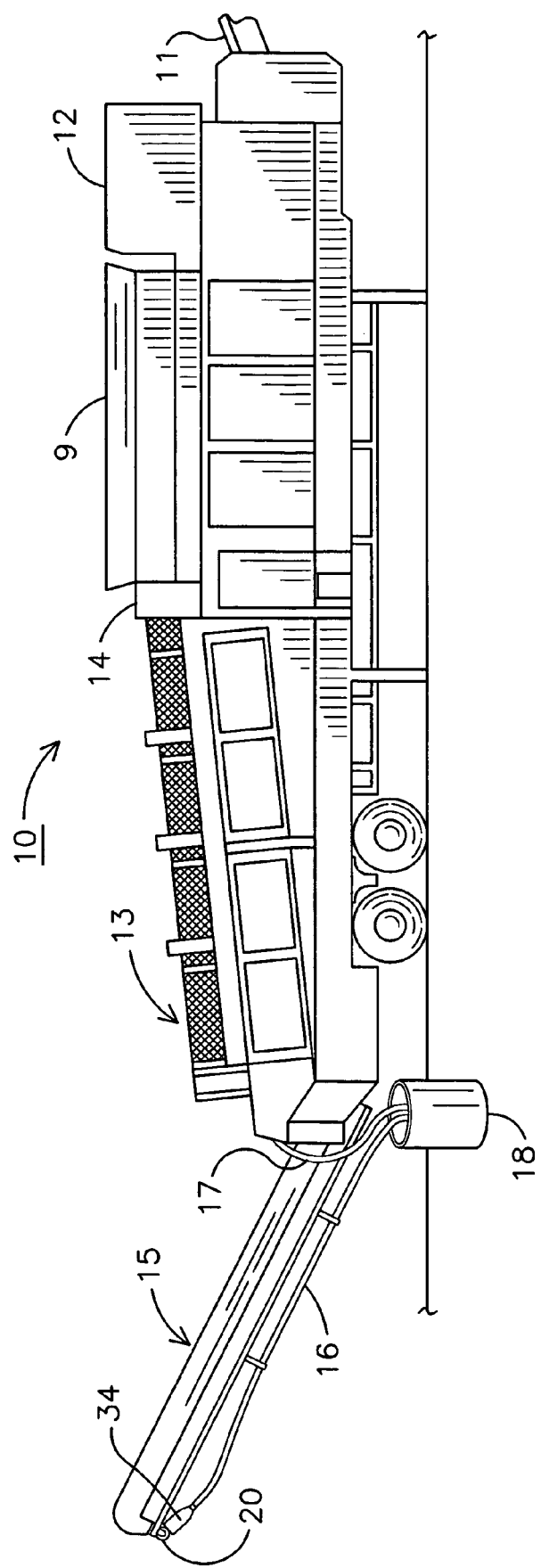
FIG. 1 is a side elevation of a woodwaste processing system having a trommel therein.

Referring to the drawings of FIGS. 1 through 4 and especially FIG. 1, a woodwaste recycling apparatus 10 is illustrated having an input conveyor 11 along with a hopper 12 at one end and a trommel 13 located at the other end and having a blower 14 for directing air through the inside of the trommel screen. An output conveyor 15 is connected to the end of the trommel 13. Vacuum hoses 16 and 17 can be seen feeding into a vacuum tank 18. Vacuum hose 17 connects to an elongated vacuum pipe or tube mounted in the trommel while the vacuum hose 16 is connected to a vacuum nozzle 20 attached to the end of the conveyor 15. Vacuum nozzle 20, on the end of the conveyor 15, also has an electrode formed therein for placing a polarized voltage onto the pipe for capturing pieces of plastic from the chipped wood particles leaving the trommel 13 on the conveyor 15 and passing over the electrode. Plastic particles can then be vacuum away through the vacuum hose 16 into the vacuum collecting container 18.

Figure 2:
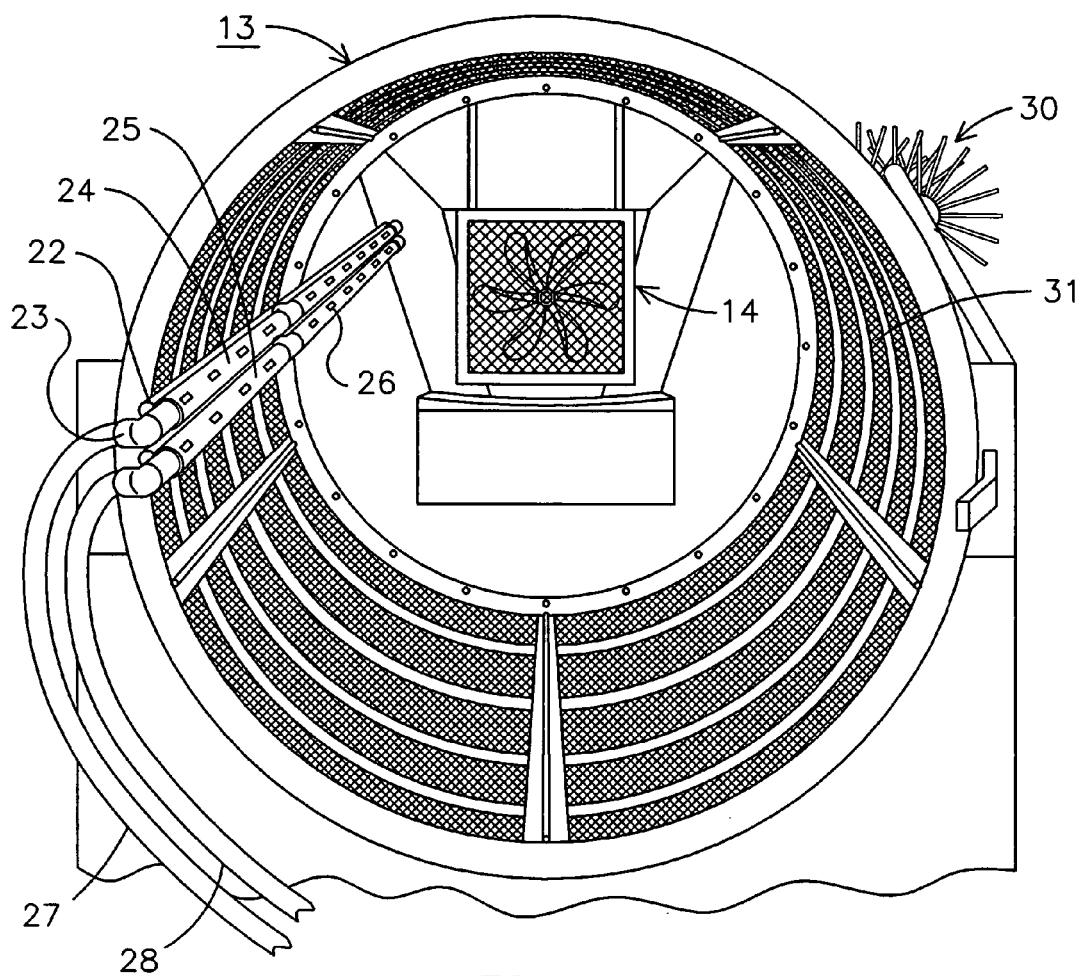
FIG. 2 is a perspective view of the end of the rotating trommel screen.
Figure 3:
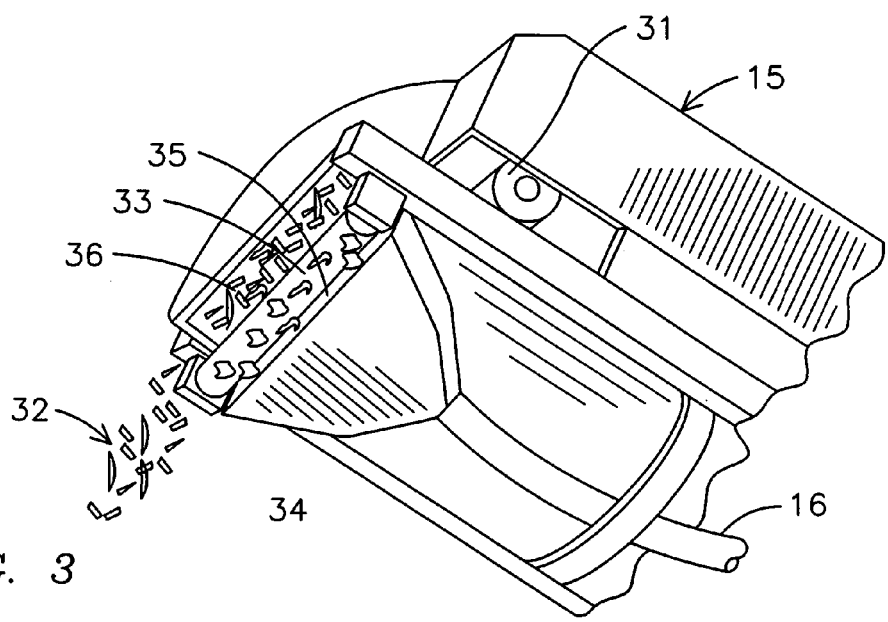
FIG. 3 is a perspective view of the end of the discharge conveyor.

FIG. 2 more clearly illustrates the inside of the rotating trommel 13 having the trommel screen 21 for removing fine sand and fine particles through the screen as it rotates while a blower 14 is illustrated at one end of the trommel 13 for blowing through the trommel. A pair of elongated electrodes 22 and 23 are connected to pass through the trommel 13 and adjacent the side of the trommel and are mounted at each end thereof. As the trommel 13 rotates around the electrodes 22 and 23, the polarized charge on the electrodes 22 and 23 collect small plastic pieces passing thereby. The plastic pieces have been ground up with the woodwaste and inherently carry a static electric charge. The pair of vacuum pipes 24 and 25 may also form the electrodes and each has a plurality of openings 26 therein and a vacuum pipe 24 is connected to a vacuum hose 27 while vacuum pipe 24 is connected to a vacuum hose 28. The vacuum hoses are placed to apply a vacuum to suck air through the holes 26 adjacent electrodes 22 or 23. The pipes 24 and 25 may also be the electrodes collecting the small particles of plastic which are then sucked into the vacuum pipes 24 and 25 and out the vacuum hoses 27 and 28. The trommel screen has rotating brushes 30 for constantly cleaning the trommel screen 21 as it rotates and for removing particles that might be stuck within the screen.

Figure 4:
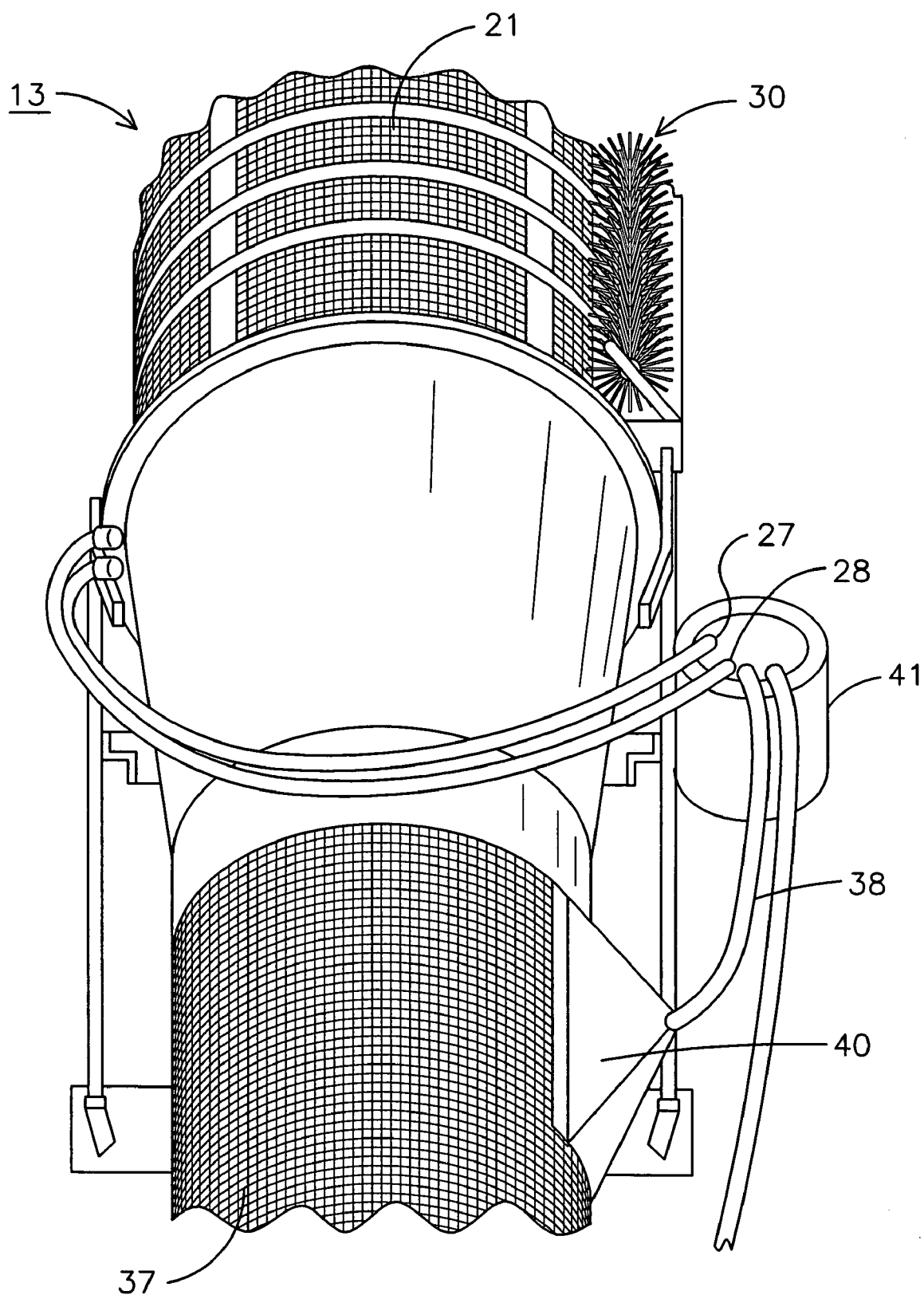
FIG. 4 is a cutaway perspective view of the outside of a portion of the trommel screen having vacuum hoses connected thereto.

FIG. 4 illustrates one end of the conveyor 15 having the end conveyor roller 31 thereon dumping the woodwaste particles 32 from the end thereof across an electrode 33 which has a polarized electric charge placed thereon for collecting small pieces of plastic having an inherent static electric charge. A collection nozzle 34 is connected to the vacuum hose 16 and has an open end 35 positioned adjacent the electrode 33 for sucking the collected plastic particles 36 into the vacuum hose 16. This system is for the collection of plastic particles that might have gotten past the electrodes placed within the trommel itself.

FIG. 4 illustrates the trommel 13 having the brushes 30 on the outside thereof for cleaning the outside of the trommel screen 21 as the trommel screen rotates. The trommel screen can remove fine particles, such as sand or the like, as well as separate woodwaste by size as the woodwaste goes through the trommel screen. An additional trommel screen 37 may have a vacuum hose 38 connected to a collection manifold 40 which is placed against the screen 37 for removing fine particles within the screen. Vacuum hoses 27 and 28 are also seen in this view connected to a vacuum collection container 41 also having the vacuum hose 38 connected thereto.

In operation, the ground up woodwaste along with portions of plastic bags and any other material collected is initially placed in the input conveyor 11 or in the hopper 12 and passes through an initial screening system 9 which can remove metal particles and the like from the woodwaste. The ground up woodwaste products are fed into the trommel 13 at one end while the trommel is rotating. It also has a fan blowing in one end. As the trommel 13 rotates, the electrodes 22 and 23 are collecting plastic pieces that are passing thereby while fine sand and other fine particles are passing through the trommel screen. The collected plastic is then vacuumed through the holes 26 in the vacuum pipes 24 and 25 to remove the plastic parts away from the electrode. The woodwaste product passing through the trommel 13 and having ground up components of plastic removed therefrom is then fed to the conveyor 15 where it passes over an additional electrode 33 where it collects any remaining plastic particles 36 which are then drawn into the vacuum nozzle 34 and through the vacuum hose 16 while the woodwaste products are discharged from the end of the conveyor.

It should be clear at this time that a system for recycling woodwaste has been provided and in particular to an apparatus and method for separating contaminants from woodwaste to produce mulch or material for potting mix or other useful products including woodwaste that can be burned to produce electricity. However, the present invention is not to be construed as limited to the forms shown which are to be considered illustrative rather than restrictive.

I claim:

1. A woodwaste and plastic processing trommel comprising:
    a rotating trommel for receiving and separating woodwaste by size, said trommel having an input for receiving woodwaste thereinto and an output therefrom for discharging woodwaste therefrom;
    an elongated electrode mounted in said trommel for placing a polarized electric charge thereon during operation of said trommel for attracting plastic pieces having a static electric charge thereon mixed in said woodwaste;
    an elongated vacuum pipe mounted in said trommel adjacent said electrode, said vacuum pipe having a plurality of openings positioned to remove plastic pieces clinging to said elongated electrode;
    whereby plastic waste is removed during the operation of a trommel.

2. The woodwaste and plastic processing trommel in accordance with claim 1 having a plurality of elongated electrodes mounted in said trommel.

3. The woodwaste and plastic processing trommel in accordance with claim 2 having a plurality of vacuum pipes mounted in said trommel, each of said plurality of vacuum tubes being mounted adjacent one said electrode.

4. The woodwaste and plastic processing trommel in accordance with claim 3 in which each said electrode and each said vacuum pipe is mounted adjacent the inside edge of said trommel screen and having said trommel screen rotating therearound.

5. The woodwaste and plastic processing trommel in accordance with claim 4 in which each said electrode forms the vacuum pipe for removing collected plastic pieces.

6. The woodwaste and plastic processing trommel in accordance with claim 1 having a discharge conveyor having a woodwaste discharge and discharging woodwaste and having a discharge end electrode mounted on the discharge end of said discharge conveyor for attracting plastic pieces in woodwaste passing thereby.

7. The woodwaste and plastic processing trommel in accordance with claim 6 having a suction nozzle mounted adjacent said discharge end electrode for removing plastic pieces clinging to said discharge end electrode.

8. A method of removing plastic intermixed with woodwaste in a woodwaste processing trommel comprising the steps of:
   selecting a rotating trommel for receiving and separating woodwaste by size, having an elongated electrode mounted therein for placing a polarized electric charge thereon during operation of said trommel and an elongated vacuum pipe mounted adjacent said electrode, and having a plurality of openings positioned adjacent said elongated electrode;
   receiving woodwaste having plastic pieces therein in an input to said selected rotating trommel;
   placing a static electric charge on said electrode;
   capturing plastic pieces from said woodwaste onto said electrode; and
   vacuum removing of said captured plastic pieces through said vacuum pipe; whereby intermixed plastic pieces are removed from woodwaste during the processing of woodwaste in a trommel.

9. The method of removing plastic intermixed with woodwaste in a woodwaste processing trommel in accordance with claim 8 in which the step of selecting a rotating trommel includes selecting a rotating trommel having a plurality of elongated electrodes therein.

10. The method of removing plastic intermixed with woodwaste in a woodwaste processing trommel in accordance with claim 9 in which the step of selecting a rotating trommel includes selecting a rotating trommel having a plurality of vacuum pipes therein.

11. The method of removing plastic intermixed with woodwaste in a woodwaste processing trommel in accordance with claim 10 in which the step of selecting a rotating trommel includes having each said elongated electrode and each said vacuum pipe positioned adjacent said inner walls of said trommel.

12. The method of removing plastic intermixed with woodwaste in a woodwaste processing trommel in accordance with claim 11 in which the step of selecting a vacuum tube includes selecting a conductive tube connected to form an electrode.

13. The method of removing plastic intermixed with woodwaste in a woodwaste processing trommel in accordance with claim 8 including selecting a rotating trommel having a discharge conveyor having a woodwaste discharge end and having a discharge end electrode attached to the discharge end of said discharge conveyor for attracting plastic pieces in woodwaste passing thereby.

14. The method of removing plastic intermixed with woodwaste in a woodwaste processing trommel in accordance with claim 13 including selecting a rotating trommel having a discharge conveyor having a suction nozzle mounted adjacent said discharge end electrode for removing plastic pieces clinging to said discharge end electrode.

* * * * *